United States Patent [19]
Wycoff

[11] 3,798,546
[45] Mar. 19, 1974

[54] AUTOMATIC IDENTIFICATION SYSTEM

[76] Inventor: Keith H. Wycoff, P.O. Box 308, Lexington, Nebr. 68850

[22] Filed: Nov. 8, 1971

[21] Appl. No.: 196,315

[52] U.S. Cl. .................. 325/166, 325/168, 325/183
[51] Int. Cl. .............................................. H04h 1/00
[58] Field of Search ........... 325/166, 152, 183, 168, 325/169; 179/100.2 RE

[56] References Cited

UNITED STATES PATENTS

| | | | |
|---|---|---|---|
| 3,387,101 | 6/1968 | Skiles | 325/166 |
| 3,522,538 | 8/1970 | Czumak | 325/166 |

*Primary Examiner*—Benedict V. Safourek
*Assistant Examiner*—A. M. Psitos
*Attorney, Agent, or Firm*—Prangley, Dithmar, Vogel, Sandler & Stotland

[57] ABSTRACT

A microphone and a reproducing means are coupled to the modulator of a transmitter. A switch, when actuated to a first position, energizes the transmitter power supply to produce a carrier wave which can be modulated by the user's voice. A holding circuit is provided, so that, when the user releases the switch, the transmitter power supply remains energized so as not to interrupt the carrier wave. Then, a secondary message, such as a set of call letters, automatically modulates the carrier wave. A timer mechanism may be provided to cause the call letters to be sent only after the first voice transmission within a predetermined time interval, such as 15 or 30 minutes.

27 Claims, 6 Drawing Figures

AUTOMATIC IDENTIFICATION SYSTEM

It is an important object of the present invention to provide an automatic identification system which automatically transmits the call letters of the transmitter after a voice message without interrupting the transmission of the carrier wave.

Another object is to provide an automatic identification system which minimizes wear and tear on the transmitter with which such a system is used.

Still another object is to provide an automatic identification system which sends the transmitter's call letters automatically after the first voice transmission in a predetermined time interval, without carrier wave interruption, but will not transmit the call letters again during that predetermined time interval.

In summary, there is provided in a transmitter having a carrier wave generating circuit and a power supply therefor and a modulator, an automatic identification system comprising a microphone for converting sounds applied thereto into first electrical signals, reproducing means for playing a device having a prerecorded message thereon and converting the message into second electrical signals, the modulator being coupled to the microphone and to the reproducing means for modulating the carrier wave in accordance with the first or second electrical signals, switching means coupled to the power supply and having a first condition to couple a voltage thereto for energization thereof and having a second condition to isolate the voltage from the power supply, the switching means being operated into the first condition thereof when it is desired to speak into the microphone, a control circuit operatively coupled to the switching means and responsive to the placement thereof in the first condition and thereafter in the second condition to provide energizing signals, the reproducing means being coupled to the control circuit and responsive to the energizing signals to convert the prerecorded message into second electrical signals for application to the modulator, and holding means operatively coupled to the control circuit and to the power supply and responsive to the energizing signals to maintain the power supply energized despite the switching means being in its second condition, whereby placement of the switching means in its first condition causes transmission of the carrier wave and enables modulation of the carrier wave with its first electrical signals and the subsequent placement of the switching means in the second condition automatically continues transmission of the carrier wave and modulates it with the second electrical signals.

Alternatively, the automatic identification system comprises a microphone for converting sounds applied thereto into first electrical signals, reproducing means for playing a device having a prerecorded message thereon and converting the message into second electrical signals, the modulator being coupled to the microphone and to the reproducing means for modulating the carrier wave in accordance with the first or second electrical signals, switching means coupled to the power supply and having a first condition to couple a voltage thereto for energization thereof and having a second condition to isolate the voltage from the power supply, the switching means being operated into the first condition thereof when it is desired to speak into the microphone, a control circuit operatively coupled to the switching means and responsive to the placement thereof in the first condition and thereafter in the second condition to provide energizing signals, the reproducing means being coupled to the control circuit and responsive to the energizing signals to convert the prerecorded message into second electrical signals for application to the modulator, holding means operatively coupled to the control circuit and to the power supply and responsive to the energizing signals to maintain the power supply energized despite the switching means being in its second condition, whereby placement of the switching means in its first condition causes transmission of the carrier wave and enables modulation of the carrier wave with the first electrical signals and the subsequent placement of the switching means in the second condition automatically continues transmission of the carrier wave and modulates it with the second electrical signals, disabling means having a disabling condition for preventing the reproducing means from converting the prerecorded message into second electrical signals despite the switching means having been successively placed in the first and the second conditions, and timing means coupled to the disabling means for placing the disabling means in the disabling condition thereof for recurring predetermined periods of time.

With the foregoing and other objects in view, which will appear as the description proceeds, the invention consists of certain novel features and a combination of parts hereinafter fully described, illustrated in the accompanying drawings, and particularly pointed out in the appended claims, it being understood that various changes in the details of the circuitry may be made without departing from the spirit or sacrificing any of the advantages of the invention.

For the purpose of facilitating an understanding of the invention, there is illustrated in the accompanying drawings a preferred embodiment thereof, from an inspection of which, when considered in connection with the following description, the invention, its mode of construction, assembly and operation, and many of its advantages should be readily understood and appreciated.

Figures 1, 2:
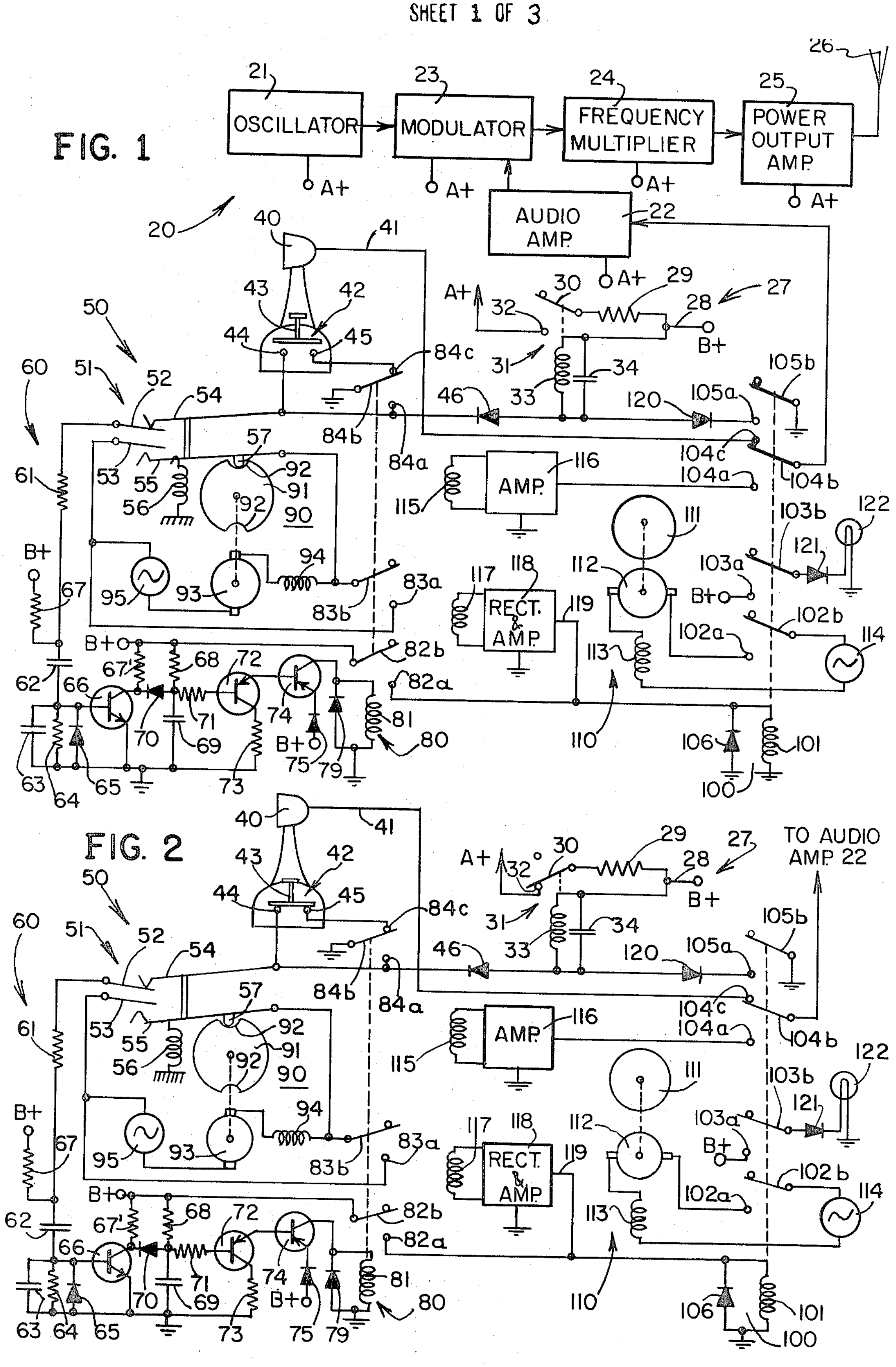
FIG. 1 illustrates a transmitter partially in block and partially in schematic, including therein an automatic identification system, incorporating therein the features of the present invention, the automatic identification system being in position to transmit a voice message followed automatically by the call letters.
FIG. 2 illustrates the automatic identification system during the transmission of a voice message.

Referring now to the drawings, and more particularly to FIG. 1 thereof, there is shown a communication transmitter 20 made in accordance with and embodying the principles of the present invention. The transmitter 20 is adapted to generate an RF carrier wave modulated selectively by audio signals and intermittently by a set of call letters to identify the particular transmitter on the air. Present FCC regulations require a transmitter to transmit its call letters every 15 or 30 minutes during the period during which the transmitter is being operated.

The transmitter 20 includes an oscillator 21 which develops on its output a relatively low frequency oscillatory signal. An audio amplifier 22 has its output coupled to a first input of the modulator 23, the second input thereof being coupled to the output of the oscillator 21. The signals from the audio amplifier 22, which may be a voice message or the call letters, are modulated by the modulator 23 onto the relatively low frequency oscillatory signal. The modulated oscillatory signal is applied to a frequency multiplier 24 which increases the frequency of the oscillatory signal. The relatively-high frequency signal is applied to a power output amplifier 25 wherein the signal strength is increased, thereby to provide a high level, frequency-multiplied carrier wave which is emitted from an antenna 26. Although the transmitter 20 is of the FM type, any other type may be employed.

The transmitter 20 also includes a power supply 27 having a conductor 28 on which appears a B+ DC voltage. In a stationary transmitter, the B+ voltage is supplied by rectifying a conventional 117-volt 60-cycle AC source, and in a mobile transmitter, it is typically supplied by batteries or a portable generator. The conductor 28 is coupled via a resistor 29 to one contact 30 of a relay 31, which relay 31 has a second contact 32 and a relay winding 33. The relay 31 is energized, in a manner to be presently described, to close the contact 30 and 32, which provides an A+ operating voltage for the various elements of the transmitter 20, including, but not limited to, the oscillator 21, the audio amplifier 22, the modulator 23, the frequency multiplier 24, and the power amplifier 25.

The transmitter 20 also includes a microphone 40 having associated therewith an output conductor 41 and a push-to-talk switch 42 having a movable contact 43 and a pair of fixed contacts 44 and 45. The push-to-talk switch 42 has a closed position when the contact 43 engages the contacts 44 and 45 and an open position which is the position shown in FIG. 1. The movable contact 43 is spring-biased to the open position.

The transmitter 20 further includes an automatic identification system 50, which includes a disabling switch 51 having a pair of fixed contacts 52 and 53 and a pair of ganged movable contacts 54 and 55. An ear 57 is schematically shown to be mounted on the contact 55. The switch 51 is shown schematically as including a spring 56 which pulls the contacts 54 and 55 downwardly so as to tend to cause the contacts 52 and 54 to be closed and the contacts 53 and 55 to be open. The contact 52 is coupled to a control circuit 60, which includes a resistor 61 and a capacitor 62 coupled in series. A capacitor 63, a resistor 64 and a diode 65 are coupled in parallel between the base of an NPN transistor 66 and ground reference potential. The capacitor 62 is also coupled to the base of the transistor 66. A resistor 67 is coupled from the B+ supply voltage to the juncture of the resistor 61 and the capacitor 62. The emitter of the transistor 66 is coupled to ground reference potential and the collector is coupled via a load resistor 67' to the B+ supply voltage. Another resistor 68 is coupled in series with a capacitor 69 from the B+ supply voltage to ground reference potential. A diode 70 is coupled from the collector of the transistor 66 to the juncture of the resistor 68 and the capacitor 69. A resistor 71 is coupled from that juncture to the base of a PNP transistor 72, the collector of which is coupled to ground reference potential by way of a resistor 73 and the emitter of which is coupled to a base of a further PNP transistor 74. The emitter of the transistor 74 is coupled by way of a diode 75 to the B+ supply voltage, and the collector of the transistor 74 is coupled to the winding 81 of a relay 80. A diode 79 is coupled across the winding 81. The relay 80 includes a pair of contacts **82*a* and 82*b*; a pair of contacts 83*a* and 83*b*; and a set of contacts 84*a*, 84*b* and 84*c***.

The automatic identification system 50 further comprises a timing mechanism 90, which includes a circular cam 91 which is rotatably mounted at its center and includes a pair of diametrically opposite notches 92. The ear 57 on the contact 55 is adapted to seat in one of the notches 92. Associated with the cam 91 is a motor 93 having its field winding 94 coupled to the contact **83*b* of the relay 80 and coupled to a source of AC power 95. Also, the contact 83*a* is coupled to the contact 53 on the disabling switch 51, and the contact 83*b* is coupled to the contact 55 of the disabling switch 50. Thus, the set of contacts 83*a* and 83*b* is effectively in parallel with the contacts 53 and 55**.

The contact **82*a* of the relay 80 is coupled to the winding 101 of a relay 100. The relay 100 also has a pair of contacts 102*a* and 102*b*; a pair of contacts 103*a* and 103*b*; a set of contacts 104*a*, 104*b*, and 104*c*; and a pair of contacts 105*a* and 105*b*. The relay 100 may be considered as part of the control circuit 60. The contact 84*a* is coupled by way of diode 46 to the winding 33 of the relay 31 and to the contact 44 of the switch 42. The movable contact 84*b* is coupled to ground and the contact 84*c* is coupled to the contact 45**.

To play the call letters, the automatic identification system 50 further comprises a reproducing means 110, which includes a turntable 111 driven by a motor 112 having a field winding 113. The motor 112 and the field winding 113 are coupled in series with a source of AC power 114 and the contacts **102*a* and 102*b*. Accordingly, closure of the contacts 102*a* and 102*b* causes power to be applied to the motor 112 to drive the turntable 111. In the particular form shown, the turntable 111 drives a double-track magnetic tape. A first head 115 is adapted to pick up the information on the first track and apply it to an amplifier 116, and a second head 117 picks up the information on the second track, which information is coupled to a rectifier and amplifier 118. The material on the first track constitutes a message to be intermittently transmitted, such as the call letters of the transmitter 20, while the information on the second track constitutes a control signal present for the duration of the message on the first track. The control signal is rectified and amplified so as to provide on the conductor 119 a DC voltage present for the duration of the message, which conductor 119 is connected to the relay winding 101. The output of the amplifier 116 is coupled to the contact 104*a* of the relay 100. The contact 104*b* is coupled to the audio amplifier 22 and the contact 104*c* is coupled to the conductor 41** which in turn constitutes the output of the microphone 40. The contact 105*a* is connected by way of a diode 120 to the winding 33 of the relay 31, and the contact 105*b* is on ground. The contact 103*a* of the relay 100 is coupled to the B+ supply voltage and the contact 103*b* is coupled through a diode 121 to a light bulb 122, the other terminal of the light bulb 122 being coupled to ground reference potential.

FIG. 1 represents the condition of the automatic identification system 50 in which the message prerecorded on the tape will be sent after the very next voice transmission. Thus, the cam 91 of the timing mechanism 90 has rotated to a point where the ear 57 is seated in one of the notches 92 by virtue of the action of the spring 56. The contacts 53 and 55 will be open so that no power is applied to the motor 93 and the cam 91 remains stationary. Also, the contacts 52 and 54 are closed and the contacts 83*a* and 83*b* are open. The capacitor 62 is charged to the B+ supply voltage by way of the resistor 67.

Referring now to FIG. 2, there is shown the condition of the system during the transmission of a voice message. When the operator wishes to speak into the microphone 40, he depresses the contact 43 so as to engage the contacts 44 and 45 as shown. This completes a path from ground reference potential, through the contacts 84*b* and 84*c*, through the contacts 43, 44 and 45, through the diode 46, through the relay winding 33 to the B+ supply voltage on the conductor 28. In other words, a voltage equal to ground reference potential is coupled to the winding 33. The current which is thereby caused to flow through the winding 33 causes energization thereof so as to close the contacts 30 and 32 and thereby furnish the A+ supply voltage. The A+ supply voltage is delivered to the various elements of the transmitter 20 so as to cause the same to furnish a carrier wave as previously explained. Nothing thus far has affected the relay 100, whereby it remains in the position shown in FIG. 1. Thus, the contact 104*c* is connected to the contact 104*b*, thereby to complete a path from the output of the microphone 40 along the conductor 41 to the input of the audio amplifier 22. With the transmitter 20 generating a carrier wave, the operator may speak into the microphone 40 which converts the sounds applied thereto into electrical signals. These electrical signals are applied to the audio amplifier 22 which amplifies and applies them to the modulator 23. The modulator 23 modulates the signal produced by the oscillator 21 in accordance with the electrical signals from the microphone 40.

Also, the actuation of the switch 42 completes a circuit from ground reference potential, through the diode 65, the capacitor 62, the resistor 61, the contacts 52 and 54, and the contacts 43, 44 and 45, the contacts 84*b* and 84*c*, back to ground reference potential. The very low forward resistance of the diode 65 and the low value of the resistor 61 enable the capacitor 62 to discharge very quickly while the switch 42 is actuated.

Figure 3:
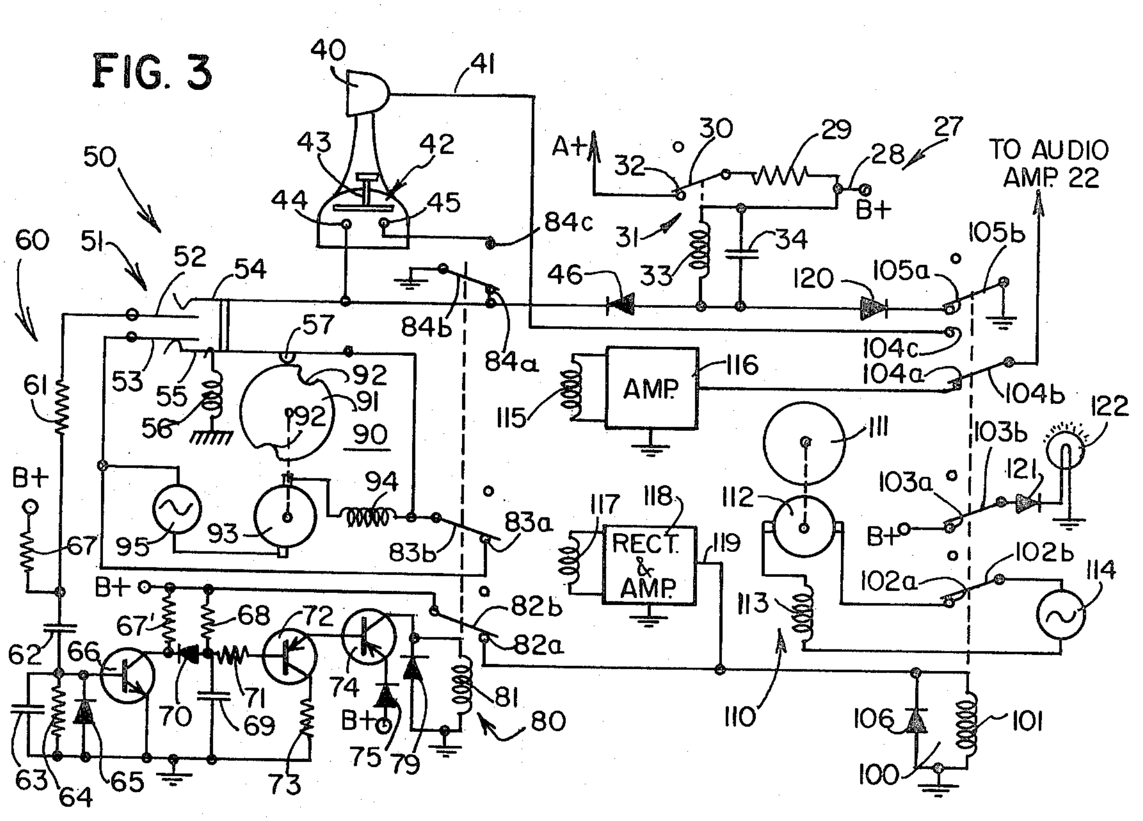
FIG. 3 illustrates the automatic identification system just subsequent to transmission of the voice message and at the start of the transmission of the call letters.

As long as the operator is speaking into the microphone 40, he will maintain the switch 42 actuated. As soon as he has completed his voice message, he releases the contact 42, which is spring-biased to return to the opened condition shown in FIG. 3. A charging path for the capacitor 62 is then defined from the B+ supply voltage, through the resistor 67, the capacitor 62 and the base-emitter junction of the transistor 66. The transistor 66 will continue to conduct to some predetermined point on the charge-up curve of the capacitor 62, the characteristic of that curve being determined primarily by the value of the capacitor 62 and the resistor 67. When the transistor 66 conducts, the capacitor 69 discharges very rapidly through the diode 70 and through the collector and the emitter of the transistor 66. This completes a path for current to flow from the B+ supply voltage through the diode 75, the base-emitter junction of the transistor 74, the base-emitter junction of the transistor 72, the resistor 71, the diode 70 and the collector and the emitter of the transistor 66, thereby rendering the transistors 72 and 75 also conductive. Thus, current will flow from the B+ supply voltage, through the diode 75, through the emitter and the collector of the transistor 74 and through the winding 81 of the relay 80. The energization of the winding 81 pulls the movable contacts 82*b*, 83*b* and 84*b* downwardly, as viewed in FIG. 2, so as to contact respectively the contacts 82*a*, 83*a* and 84*a*, as shown in FIG. 3.

Closure of the contacts 82*a* and 82*b*, completes a path for the B+ supply voltage to appear across the relay winding 101 of the relay 100, thereby energizing the same. The movable contacts 102*b*, 103*b*, 104*b* and 105*b* are pulled downwardly, as viewed in FIG. 2, so as to contact respectively the contacts 102*a*, 103*a*, 104*a* and 105*a*. This is the condition of the relays 80 and 100 depicted in FIG. 3. By virtue of the closure of the contacts 83*a* and 83*b*, a path for power to the motor 93 is completed which begins to rotate the cam 91 clockwise in the particular form shown so as to cause the ear 57 to move out of the notch 92 against the action of the spring 56. Thus, the contacts 53 and 55 are closed and the contacts 52 and 54 are open. It should be noted that the contacts 53 and 55 are effectively in parallel with the contacts 83*a* and 83*b* so that if either pair of contacts are closed, the motor 93 receives energizing power. At this point of time, both contacts are closed, whereby the cam 91 will continue to rotate until both sets are open. Despite the fact that the push-to-talk switch 42 is in its open position, the power supply 27 continues to supply an A+ operating voltage for the carrier wave generating curciut including the elements 21 to 25. This is a result of the contact 84*b* engaging the contact 84*a*, thereby providing ground reference potential on the cathode of the diode 46 to provide a continuous current path for current through the winding 33 so as to maintain closed the contacts 30 and 32. The capacitor 34 has sufficient storage to maintain the contacts 30 and 32 closed during the switching of the contact 84*b*.

Figure 4:
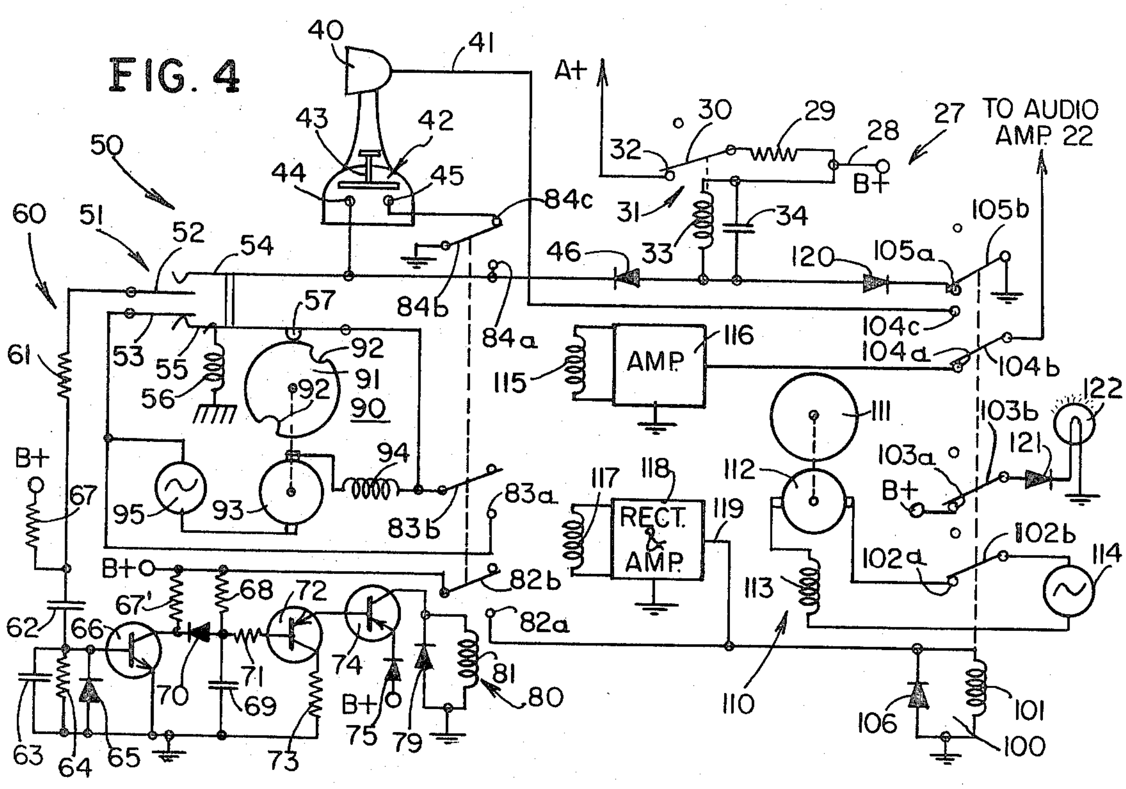
FIG. 4 illustrates the automatic identification system in which the transmission of the call letters is being completed.

Referring to FIG. 4, the transistor 66 is rendered conductive for a very short period of time by virtue of the values of the resistor 67 and the capacitor 62. As soon as the transistor 66 becomes non-conductive, the capacitor 69 begins to charge from the B+ supply voltage by way of the resistor 68. As soon as the voltage across the capacitor 69 has reached a predetermined value, the transistor 72 will become non-conductive as will the transistor 74, thereby de-energizing the relay 80 and causing the contacts 82, 83, and 84 to revert to their original positions as shown in FIG. 4. Thus, the resistor 68 and the capacitor 69 constitute a timing circuit to control the length of time the relay 80 is energized. The diode protects the contacts of the relay 80 when the field in the winding 81 collapses after de-energization. The diode 79 protects the transistor 74.

With the relay 100 in the condition shown in FIG. 4, the contacts 102*a* and 102*b* are closed to enable power from the source 114 to be delivered to the motor 112, thereby rotating the turntable 111. The call letters on one track of the magnetic tape driven by the turntable 111 are picked up by the magnetic head 115, amplified in the amplifier 116 and delivered through the contacts 104*a* and 104*b* to the audio amplifier 22. The control signal on the other track is picked up by the magnetic head 117, the AC signal being rectified and amplified in the circuit 118. The DC voltage thereby formed is applied via the conductor 119 to the winding 101 of the relay 100. Thus, despite the fact that at this time the relay 80 has become de-energized to open the contacts 82*a* and 82*b*, a DC voltage is still applied to the winding 101 to maintain it energized. The contacts 103*a* and 103*b* being closed enables a DC voltage to be applied to the lamp 122 to illuminate the same and thereby advise the operator that the call letters are being transmitted and not to speak into the microphone 40. At this time it should be pointed out that should the operator speak into the microphone 40 unknowing that the call letters are being transmitted, the electrical signals converted from the voice message would not be applied to the audio amplifier, since the contacts 104*b* and 104*c* are open.

The closure of the contacts 105*a* and 105*b* ground the cathode of the diode 120 thereby maintaining ground potential on the relay winding 33 of the relay 31 so as to continue energization thereof and maintain the contacts 30 and 32 closed despite the fact that the push-to-talk switch 42 is in its open condition and the contacts 84*a* and 84*b* of the relay 80 are in their open condition. Thus the contacts 105*a* and 105*b* constitute a holding means to hold the carrier wave on after the switch 42 is released.

Figure 5:
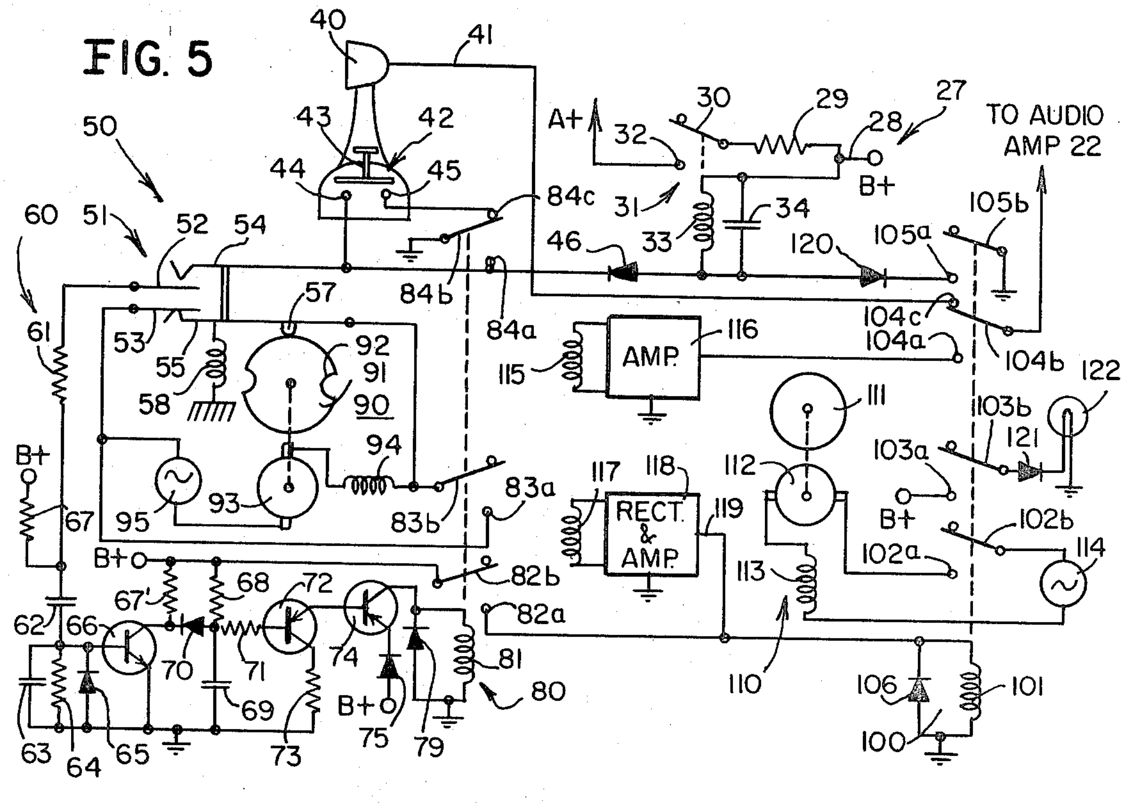
FIG. 5 illustrates the automatic identification system after the call letter transmission has been completed, the timer mechanism being in such condition that the next voice message will not be followed by a call letter transmission.

Turning now to FIG. 5, there is illustrated the condition of the automatic identification system 50 after the call letter transmission has been completed. The control signal on the second track of the magnetic tape will terminate essentially at the same time as the termination of the message on the first track. Accordingly, the end of the voice message will result in no DC voltage being developed on the conductor 119, thereby de-energizing the relay 100 and causing the contacts thereon to revert to the positions shown in FIG. 5. Thus, the motor 112 will no longer be operating the turntable 111. The contacts 103*a* and 103*b* will open thereby extinguishing the lamp 122, advising the operator that the call letters have been completed. The contacts 104*b* and 104*c* are again in engagement to permit the subsequent voice messages applied to the microphone 40 to be applied to the audio amplifier 22. Finally, the contacts 105*a* and 105*b* are disengaged so as effectively to de-energize the power supply 27, whereupon transmission of the carrier wave ceases.

However, because the contacts 53 and 55 of the switch 51 are closed, power from the source 95 continues to be applied to the motor 93 thereby rotating the cam 91 to the position shown in FIG. 5. The cam 91 will continue to rotate until the contacts 53 and 55 are opened. This will occur when the cam 91 has rotated clockwise 90° additional to that shown in FIG. 5 whereupon the ear 57 will seat within the left-hand notch 92, as viewed in FIG. 5. When the cam 91 has reached that position, it will have completed a cycle and the automatic identification system 50 will again be in the condition shown in FIG. 1.

With the automatic identification system 50 in the condition shown in FIG. 5, the operator may desire to speak into the microphone 40 and transmit a voice message. As was explained previously in respect to FIG. 1, the push-to-talk switch 42 is operated by depressing the movable contact 43 which causes the power supply 27 to develop the A+ operating voltage for the transmitter. The operator's voice is converted by the microphone 40 into electrical signals which are applied to the audio amplifier 22 and are modulated on a carrier wave all as explained previously in respect to FIG. 2. However, contrary to FIG. 2, the capacitor 62 cannot discharge by virtue of the fact that the contacts 52 and 54 are now open. Accordingly, when the operator completes his message, and releases the contact 43, the capacitor 62 is not in position to be charged by the B+ supply voltage. Accordingly, the relay 80 will not become energized and of course neither will the relay 100. Thus, at the completion of this voice message, the call letters will not be transmitted. At the end of the first voice message following the time that the ear 57 seats in the left-hand notch 92, the call letters will again be transmitted.

By selecting the speed of rotation of the cam 91 the recurrence rate of the call letter transmission may be selected. Thus, for example, if FCC regulations require that the call letters be transmitted every 30 minutes while the station is on the air, then the cam 91 should revolve at one revolution per hour, in which case the ear 57 will seat within one of the notches 92 every 30 minutes, or alternatively one revolution per half hour if the cam 91 has only one notch. Use of multiple notches permits replacement of the cam 91 to provide a simple means of changing the period between subsequent identification.

The capacitor 34 is provided to prevent the relay 31 from becoming de-energized in response to an instantaneous lack of voltage across the winding 33. For example, the winding 33 should not become de-energized in a very short period of time which the contact 84*b* moves from the contact 84*c* to the contact 84*a*. The diode 46 isolates the control circuit 60 from ground. The capacitor 63 and the resistor 64 in the control circuit 60 serve to filter the voltages present on the base of the transistor 66. The resistor 67' is a load for the transistor 66, and the diode 70 serves to isolate the load resistor 67' from the timer circuit consisting of the resistor 68 and the capacitor 69. The diodes 79 and 106 prevent damage to the relay control when the field of the relay windings 81 and 101 collapses. The diode 120 serves to isolate the contact 105*a* from the control circuit 60.

The reproducing means 110 may be a tape recorder such as is sold by Diverpro, Inc. of Beltsville, Md., which calls the device a Dial Page Identifier under the number 19C311360P1. However, other reproducing signal generating means may be provided, such as, for example, a solid state telegraph code generator. Of course the relays 80 and 100 are merely exemplary types of electronic switching means and other types such as silicon controlled rectifiers and the like are contemplated.

With the type of system described above, it should be appreciated that the transmitter is turned on and off as little as possible. Thus, if a set of call letters is to be transmitted after a particular voice message, the carrier wave does not go off the air after the voice message and then come right back on again for transmission of the call letters. Instead, circuitry is provided to insure that the carrier wave will continue to be transmitted during the voice message, and for the call letters subsequently transmitted. The result is a minimum amount of wear and tear on the transmitter by virtue of the call letters.

Figure 6:
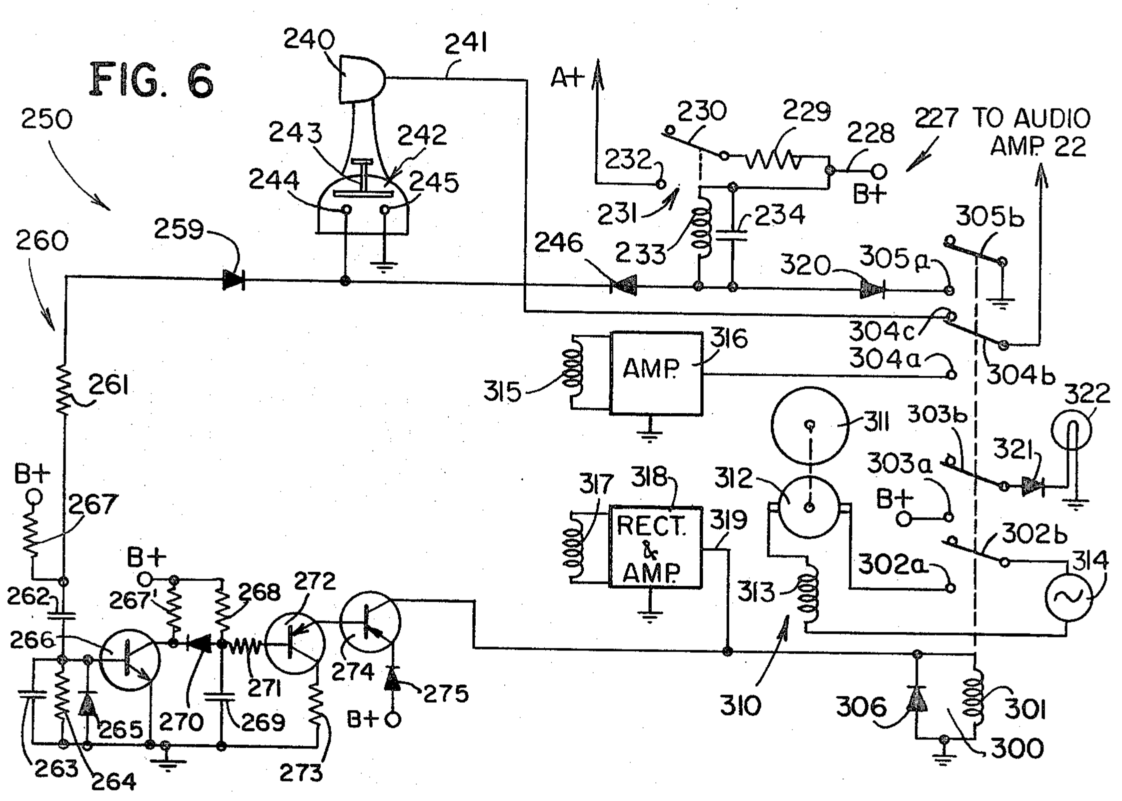
FIG. 6 illustrates a second form of the invention in which the automatic identification system does not have a timer mechanism.

Turning now to FIG. 6, an alternative form of the invention is illustrated. In FIG. 6, those parts corresponding to parts in the first form shown in FIGS. 1 to 5 are labeled with reference numerals having a factor of 200 added thereto. Basically, the system 250 of FIG. 6 has the basic feature of this invention of not permitting the transmitter to go off the air during the short interval between the end of a voice message and the commencement of the call letters so as to minimize wear and tear on the transmitter, but it differs from the first form in that no timer mechanism is provided. Hence, the call letters will be transmitted upon the termination of each voice message.

The power supply 227 associated with the system 25 has a conductor 228 on which appears a B+ DC voltage. The conductor 228 is coupled via a resistor 229 to one contact 230 of a relay 231, which relay 231 has a second contact 232 and a relay winding 233. The relay 231 is energized, in a manner to be presently described, to close the contacts 230 and 232, which provides an A+ operating voltage for the various elements of the transmitter.

There is provided a microphone 240 having associated therewith an output conductor 241 and a push-to-talk switch 242 having a movable contact 243 and a pair of fixed contacts 244 and 245. The push-to-talk switch 242 has a closed position when the contact 243 engages the contacts 244 and 245 and an open position. The movable contact 243 is spring-biased to the open position.

The system includes a control circuit 260, which has a diode 259 and a resistor 261 coupled to the contact 244 and a capacitor 262. The diode 259 prevents charge up of the capacitor 262 from the B+ voltage on the conductor 228 after release of the switch 242. A capacitor 263, a resistor 264 and a diode 265 are coupled in parallel between the base of an NPN transistor 266 and ground reference potential. The capacitor 262 is also coupled from the B+ supply voltage to the juncture of the resistor 261 and the capacitor 262. The emitter of the transistor 266 is coupled to ground reference potential and the collector is coupled via a load resistor 267' to the B+ supply voltage. Another resistor 268 is coupled in series with a capacitor 269 from the B+ supply voltage to ground reference potential. A diode 270 is coupled from the collector of the transistor 266 to the juncture of the resistor 268 and the capacitor 269. A resistor 271 is coupled from that juncture to the base of a PNP transistor 272, the collector of which is coupled to ground reference potential by way of a resistor 273 and the emitter of which is coupled to a base of a further PNP transistor 274. The emitter of the transistor 274 is coupled by way of a diode 275 to the B+ supply voltage, and the collector of the transistor 274 is coupled to the winding 301 of a relay 300. A diode 306 is coupled across the winding 301. The relay 300 also has a pair of contacts 302*a* and 302*b*; a pair of contacts 303*a* and 303*b*; a set of contacts 304*a*, 304*b*, and 304*c*; and a pair of contacts 305*a* and 305*b*. The relay 300 may be considered as part of the control circuit 260.

To play the call letters, the automatic identification system 260 further comprises a reproducing means 310, which includes a turntable 311 driven by a motor 312 having a field winding 313. The motor 312 and the field winding 313 are coupled in series with a source of AC power 314 and the contacts 302*a* and 302*b*. Accordingly, closure of the contacts 302*a* and 302*b* causes power to be applied to a motor 312 to drive the turntable 311. In the particular form shown, the turntable 311 drives a double-track magnetic tape. A first head 315 is adapted to pick up the information on the first track and apply it to an amplifier 316, and a second head 317 picks up the information on the second track, which information is coupled to a rectifier and amplifier 318. The material on the first track constitutes the call letters, while the information on the second track constitutes a control signal present for the duration of the call letters on the first track. The control signal is rectified and amplified so as to provide on the conductor 319 a DC voltage present for the duration of the message, which conductor 319 is connected to the relay winding 301. The output of the amplifier 316 is coupled to the contact 304*a* of the relay 300. The contact 304*b* is coupled to the audio amplifier 22 and the contact 304*c* is coupled to the conductor 241 which in turn constitutes the output of the microphone 240. The contact 305*a* is connected by way of a diode 320 to the winding 233 of the relay 231. The contact 303*a* of the relay 300 is coupled to the B+ supply voltage and the contact 303*b* is coupled through a diode 321 to a light bulb 322, the other terminal of the light bulb 322 being coupled to ground reference potential.

When the operator wishes to speak into the microphone 240, he depresses the contact 243 so as to engage the contacts 244 and 245 as shown. This completes a path from ground reference potential, through the contacts 243, 244 and 245, through the diode 246, through the relay winding 233, to the B+ supply voltage on the conductor 228. The current which is thereby caused to flow through the winding 233 causes energization thereof so as to close the contacts 230 and 232 and thereby furnish the A+ supply voltage. The A+ supply voltage is delivered to the various elements of the transmitter so as to cause the same to furnish a carrier wave as previously explained. Nothing thus far has affected the relay 300, whereby the contact 304*c* is connected to the contact 304*b*, so as to complete a path from the output of the microphone 240 along the conductor 241 to the input of the audio amplifier 22. With the transmitter generating a carrier wave, the operator may speak into the microphone 40 which converts the sounds applied thereto into electrical signals. These electrical signals are applied to the audio amplifier 22 which amplifies and applies them to the transmitter modulator.

Also, the actuation of the switch 242 completes a circuit from ground reference potential, through the diode 265, the capacitor 262, the resistor 261, and the contacts 243, 244 and 245, back to ground reference potential. The very low forward resistance of the diode 265 and the low value of the resistor 261 enable the capacitor 262 to discharge very quickly while the switch 242 is actuated.

As long as the operator is speaking into the microphone 240, he will maintain the switch 242 actuated.

As soon as he has completed his voice message, he releases the contact 242, which is spring-biased to return to the opened condition. A charging path for the capacitor 262 is then defined from the B+ supply voltage, through the resistor 267, the capacitor 262 and the base-emitter junction of the transistor 266. The transistor 266 will continue to conduct to some predetermined point on the charge-up curve of the capacitor 262, the characteristic of that curve being determined primarily by the value of the capacitor 262 and the resistor 267. When the transistor 266 conducts, the capacitor 269 discharges very rapidly through the diode 270 and through the collector and the emitter of the transistor 266. This completes a path for current to flow from the B+ supply voltage through the diode 275, the base-emitter junction of the transistor 274, the base-emitter junction of the transistor 272, the resistor 271, the diode 270 and the collector and the emitter of the transistor 266, thereby rendering the transistors 272 and 275 also conductive. Thus, current will flow from the B+ supply voltage, through the diode 275, through the emitter and the collector of the transistor 274 and through the winding 301 of the relay 300.

The relay 300 is thus energized to cause the contacts 302*a* and 302*b* to close to enable power from the source 314 to be delivered to the motor 312, thereby rotating the turntable 311. The call letters on one track of the magnetic tape driven by the turntable 311 are picked up by the magnetic head 315, amplified in the amplifier 316 and delivered through the contacts 304*a* and 304*b* to the audio amplifier 22. The control signal on the other track is picked up by the magnetic head 317, the AC signal being rectified and amplified in the circuit 318. The DC voltage thereby formed is applied via the conductor 319 to the winding 301 of the relay 300. Thus, despite the fact that at this time the transistor 274 has become deenergized, a DC voltage is still applied to the winding 301 to maintain it energized. The contacts 303*a* and 303*b* being closed enables a DC voltage to be applied to the lamp 322 to illuminate the same and thereby advise the operator that the call letters are being transmitted and not to speak into the microphone 240. At this time it should be pointed out that should the operator speak into the microphone 40 unknowing that the call letters are being transmitted, the electrical signals converted from the voice message would not be applied to the audio amplifier, since the contacts 304*b* and 304*c* are open.

The closure of the contacts 305*a* and 305*b* ground the cathode of the diode 320 thereby maintaining ground potential on the relay winding 233 of the relay 231 so as to continue energization thereof and maintain the contacts 230 and 232 closed despite the fact that the push-to-talk switch 242 is in its open condition.

The transistor 266 is rendered conductive for a very short period of time by virtue of the values of the resistor 267 and the capacitor 262. As soon as the transistor 266 becomes non-conductive, the capacitor 269 beings to charge from the B+ supply voltage by way of the resistor 268. As soon as the voltage across the capacitor 269 has reached a predetermined value, the transistor 272 will become non-conductive as will the transistor 274, thereby de-energizing the relay 300.

The control signal on the second track of the magnetic tape will terminate essentially at the same time as the termination of the message on the first track. Accordingly, the end of the voice message will result in no DC voltage being developed on the conductor 319, thereby de-energizing the relay 300 and causing the contacts thereon to revert to the positions shown in FIG. 6. Thus, the motor 312 will no longer be operating the turntable 311. The contacts 303*a* and 303*b* will open thereby extinguishing the lamp 322, advising the operator that the call letters have been completed. The contacts 304*b* and 304*c* are again in engagement to permit the subsequent voice messages applied to the microphone 240 to be applied to the audio amplifier 22. Finally, the contacts 305*a* and 305*b* are disengaged so as effectively to de-energize the power supply 227, whereupon transmission of the carrier wave ceases.

When the operator next wishes to transmit a voice message, he actuates the push-to-talk switch 242 as previously described. When the voice message is completed and he releases the switch 242, the relay 300 will become energized in the manner previously explained to cause the call letters to be transmitted without interrupting the carrier wave. Thus, with the system illustrated in FIG. 6, the call letters will be transmitted following every voice message.

While there has been described what is at present considered to be preferred embodiments of the invention, it is understood that various changes and modifications can be made therein without departing from the spirit and scope of the invention, and it is intended that all such changes and modifications be covered as fall within the scope of the appended claims.

What is claimed is:

1. In a transmitter having a carrier wave generating circuit and a power supply therefor and a modulator, an automatic identification system comprising input means for converting a message into first electrical signals, signal generating means for generating a predetermined message thereon and converting the message into second electrical signals, the modulator being coupled to said input means and to said signal generating means for modulating the carrier wave in accordance with the first or second electrical signals, switching means coupled to the power supply and having a first condition for energization thereof and having a second condition to de-energize the power supply, said switching means being operated into the first condition thereof when it is desired to operate said input means to provide said first electrical signals, a control circuit means operatively coupled to said switching means and responsive to the placement thereof in said first condition and thereafter in said second condition to provide energizing signals, said signal generating means being coupled to said control circuit means; and and responsive to the energizing signals to convert the predetermined message into second electrical signals for application to the modulator, and holding means operatively coupled to said control circuit means and to the power supply and responsive to the energizing signals to maintain the power supply energized despite said switching means being in its second condition, whereby placement of said switching means in its first condition causes transmission of the carrier wave and enables modulation of the carrier wave with the first electrical signals and the subsequent placement of said switching means in said second condition automatically continues transmission of the carrier wave and modulates it with the second electrical signals.

2. In the transmitter set forth in claim 1, wherein said input means includes a microphone.

3. In the transmitter set forth in claim 1, wherein said signal generating means is a tape recorder.

4. In the transmitter set forth in claim 1, wherein said switching means includes a relay having a winding and a pair of contacts respectively coupled to a source of operating voltage and the carrier wave generating circuit, and a manually-operable switch coupled in circuit with said winding and a further voltage, whereby actuation of said manually-operable switch energizes said relay to close said contacts and supply the operating voltage to the carrier wave generating circuit.

5. In the transmitter set forth in claim 1, wherein said voltage is ground reference potential.

6. In the transmitter set forth in claim 1, wherein said control circuit means is electrically coupled to said switching means.

7. In the transmitter set forth in claim 1, wherein said holding means is electrically coupled to said control circuit means.

8. In a transmitter having a carrier wave generating circuit and a power supply therefor and a modulator, an automatic identification system comprising input means for converting a message into first electrical signals, signal generating means for playing a device having a predetermined message thereon and converting the message into second electrical signals, first switching means having a common output and first and second inputs respectively coupled to said input means and to said signal generating means, said first switching means having a first condition when said common output is coupled to said first input and a second condition when said common output is coupled to said second input, the modulator being coupled to said common output and being operative to modulate the carrier wave in accordance with the first or second electrical signals, second switching means coupled to the power supply and having a first condition for energization thereof and having a second condition to de-energize the power supply, said second switching means being operated into the first condition thereof when it is desired to operate said input means to provide said first electrical signals, control circuit means operatively coupled to said second switching means and responsive to the placement thereof in said first condition and thereafter in said second condition to provide energizing signals, said signal generating means being coupled to said control circuit means and being responsive to the energizing signals to convert the predetermined message into second electrical signals for application to said modulator, said first switching means being operatively coupled to said control circuit means and and responsive to the absence of the energizing signals to be placed in the first condition thereof and to the presence of the energizing signals to be placed in the second condition thereof, and holding means operatively coupled to said control circuit means and to the power supply and responsive to the energizing signals to maintain the power supply energized despite said second switching means being in its second condition, whereby placement of said second switching means in its first condition causes transmission of the carrier wave and enables modulation of the carrier wave with the first electrical signals and the subsequent placement of said second switching means in said second condition automatically continues transmission of the carrier wave and modulates it with the second electrical signals.

9. In the transmitter of claim 8, wherein said first switching means is a relay, said common output is a movable contact, and said first and second inputs are respectively fixed contacts.

10. In a transmitter having a carrier wave generating circuit and a power supply therefor and a modulator, and automatic identification system comprising a microphone for converting sounds applied thereto into first electrical signals, reproducing means for playing a device having a prerecorded message thereon and converting the message into second electrical signals, the modulator being coupled to said microphone and to said reproducing means for modulating the carrier wave in accordance with the first or second electrical signals, switching means coupled to the power supply and having a first condition for energization thereof and having a second condition to de-energize the power supply, said switching means being operated into the first condition thereof when it is desired to speak into said microphone, control circuit means operatively coupled to said switching means and responsive to the placement thereof in said first condition and thereafter in said second condition to provide energizing signals, said reproducing means being coupled to said control circuit means and responsive to the energizing signals to convert the prerecorded message into second electrical signals for application to the modulator, holding means operatively coupled to said control circuit means and to the power supply and responsive to the energizing signals to maintain the power supply energized despite said switching means being in its second condition, whereby placement of said switching means in its first condition causes transmission of the carrier wave and enables modulation of the carrier wave with the first electrical signals and the subsequent placement of said switching means in said second condition automatically continues transmission of the carrier wave and modulates it with the second electrical signals, disabling means having a disabling condition for preventing said reproducing means from converting the prerecorded message into second electrical signals despite said switching means having been successively placed in said first and said second conditions, and timing means coupled to said disabling means for placing said disabling means in the disabling condition thereof for recurring predetermined periods of time.

11. In the transmitter of claim 10, wherein said disabling means includes a switch coupled from said switching means to said control circuit means, said switch being open in the disabling condition of said disabling means.

12. In the transmitter of claim 10, wherein said timing means is a mechanical device.

13. In the transmitter of claim 10, wherein said timing means includes a rotating cam.

14. In a transmitter having a carrier wave generating circuit and a power supply therefor and a modulator, an automatic identification system comprising a microphone for converting sounds applied thereto into first electrical signals, reproducing means for playing a device having a prerecorded message thereon and converting the message into second electrical signals, the modulator being coupled to said microphone and to said reproducing means for modulating the carrier wave in accordance with the first or second electrical signals, first switching means coupled to the power supply and having a first condition for energization thereof and having a second condition to de-energize the power supply, said first switching means being operated into the first condition thereof when it is desired to speak into said microphone, second switching means operatively coupling said first switching means to a control circuit means, said control circuit means being responsive to the placement of said first switching means in said first condition and thereafter in said second condition to provide energizing signals, said reproducing means being coupled to said control circuit means and responsive to the energizing signals to convert the prerecorded message into second electrical signals for application to the modulator, holding means operatively coupled to said control circuit means and to the power supply and responsive to the energizing signals to maintain the power supply energized despite said first switching means being in its second condition, whereby placement of said first switching means in its first condition causes transmission of the carrier wave and enables modulation of the carrier wave with the first electrical signals and the subsequent placement of said switching first means in said second condition automatically continues transmission of the carrier wave and modulates it with the second electrical signals, and timing means mechanically coupled to said second switching means and electrically coupled to said control circuit means and responsive to the energizing signals to open said second switching means for a predetermined period of time, whereby during the predetermined period of time said reproducing means will not convert the prerecorded message into second electrical signals irrespective of the condition of said first switching means.

15. In a transmitter having a carrier wave generating circuit and a power supply therefor and a modulator, an automatic identification system comprising a microphone for converting sounds applied thereto into first electrical signals, reproducing means for playing a device having a prerecorded message thereon and converting the message into second electrical signals, the modulator being coupled to said microphone and to said reproducing means for modulating the carrier wave in accordance with the first or second electrical signals, first switching means coupled to the power supply and having a first condition for energization thereof and having a second condition to de-energize the power supply, said first switching means being operated into the first condition thereof when it is desired to speak into said microphone, second switching means operatively coupling said first switching means to a control circuit means, said control circuit means being responsive to the placement of said first switching means in said first condition and thereafter in said second condition to provide energizing signals, said reproducing means being coupled to said control circuit means and responsive to the energizing signals to convert the prerecorded message into second electrical signals for application to the modulator, holding means operatively coupled to said control circuit means and to the power supply and responsive to the energizing signals to maintain the power supply energized despite said first switching means being in its second condition, whereby placement of said first switching means in its first condition causes transmission of the carrier wave and enables modulation of the carrier wave with the first electrical signals and the subsequent placement of the said first switching means in said second condition automatically continues transmission of the carrier wave and modulates it with the second electrical signals, motor-operated cam means mechanically coupled to said second switching means and electrically coupled to said control circuit means and responsive to the energizing signals to open said second switching means for a predetermined period of time, and third switching means for coupling a source of power to the motor of said motor-operated cam means, said third switching means being coupled to said control circuit means and responsive to the energizing signals to supply power to the motor to cause said cam means to rotate and open said second switching means, said reproducing means being inoperative to convert the prerecorded message into second electrical signals irrespective of the condition of said first switching means while said second switching means is open.

16. In the transmitter of claim 15, and further comprising fourth switching means coupling a source of power to the motor of said motor-operated cam means, said fourth switching means being mechanically coupled to said cam means and being responsive to the rotation of said cam means to continue to supply power to said motor after said third switching means has opened.

17. In the transmitter of claim 16, wherein said second and fourth switching means are ganged together.

18. In a transmitter having a carrier wave generating circuit and a power supply therefor and a modulator, an automatic identification system comprising a microphone for converting sounds applied thereto into first electrical signals, reproducing means for playing a device having a prerecorded message thereon and converting the message into second electrical signals, the modulator being coupled to said microphone and to said reproducing means for modulating the carrier wave in accordance with the first or second electrical signals, switching means coupled to the power supply and having a first condition for energization thereof and having a second condition to de-energize the power supply, said switching means being operated into the first condition thereof when it is desired to speak into said microphone, a control circuit means operatively coupled to said switching means and including a relay having a winding and a pair of contacts, said control circuit means being responsive to the placement of said switching means in said first condition and thereafter in said second condition to energize said relay and close said contacts, said reproducing means being coupled to said contacts and responsive to the closure thereof to convert the prerecorded message into second electrical signals for application to the modulator, and holding means operatively coupled to said control circuit means and to the power supply and responsive to the energizing signals to maintain the power supply energized despite said switching means being in its second condition, whereby placement of said switching means in its first condition causes transmission of the carrier wave and enables modulation of the carrier wave with the first electrical signals and the subsequent placement of said switching means in said second condition automatically continues transmission of the carrier wave and modulates it with the second electrical signals.

19. In the transmitter of claim 18, wherein said reproducing means includes means for reproducing a magnetic tape having two tracks thereon, the prerecorded message being on the first track and a control signal being on the second track, said reproducing means including a first head associated with the first track to provide the prerecorded message and a second head associated with the second track to provide the control signal, said reproducing means further including a rectifier for recitfying the control signal to provide a DC voltage to maintain said relay winding energized until the termination of the message.

20. In the transmitter set forth in claim 18, wherein said reproducing means includes further holding means responsive to a control signal on the device for providing a holding signal, said further holding means being coupled to said relay to maintain said relay energized for the duration of the message.

21. In the transmitter set forth in claim 18, wherein said control circuit means includes a further relay having a further winding and a further pair of contacts, said further contacts being coupled between a source of power and said first-mentioned winding, said further relay being responsive to the successive placement of said switching means in said first and second conditions to become energized and close said further contacts, thereby coupling the source of power to said first-mentioned relay for energization thereof and thereby close said first-mentioned contacts.

22. In the transmitter of claim 18, wherein said relay further includes a set of first and second and third contacts, said first contact being coupled to the modulator and said second contact being coupled to said reproducing means and said third contact being coupled to said microphone, said first and second contacts being engaged when said relay is energized and said first and third contacts being engaged when said relay is not energized.

23. In the transmitter of claim 18, wherein said relay includes a further pair of contacts coupling a source of power to a lamp, said further pair of contacts being closed by the energization of said relay to illuminate the lamp and thereby indicate that the recorded message is being transmitted.

24. In the transmitter of claim 18, wherein said relay includes a second pair of contacts which defines said holding means, said second pair of contacts coupling a voltage to the power supply, said second pair of contacts being closed when said relay is energized to couple the voltage to the power supply to maintain the power supply energized.

25. In a transmitter having a carrier wave generating circuit and a power supply therefor and a modulator, an automatic identification system comprising a microphone for converting sounds applied thereto into first electrical signals, reproducing means for playing a device having a prerecorded message thereon and converting the message into second electrical signals, the modulator being coupled to said microphone and to said reproducing means for modulating the carrier wave in accordance with the first or second electrical signals, first switching means coupled to the power supply and having a first condition for energization thereof and having a second condition to de-energize the power supply, said first switching means being operated into the first condition thereof when it is desired to speak into said microphone, second switching means operatively coupling said first switching means to a control circuit means, said control circuit means including a first relay having a first winding and associated first and second pairs of contacts and a second relay having a second winding and associated third and fourth pairs of contacts, said first pair of contacts coupling a source of power to said second relay winding, said third pair of contacts coupling a voltage to the power supply, said fourth pair of contacts coupling a voltage to said reproducing means, said control circuit means including means responsive to the placement of said switching first means in said first condition and thereafter in said second condition to energize said first relay winding and close said first and second pairs of contacts, thereby energizing said second relay winding to close said third and fourth pairs of contacts respectively to couple an operative voltage to the power supply to maintain the power supply energized and to operate said reproducing means to convert the prerecorded message into second electrical signals for application to the modulator, whereby placement of said first switching means in its first condition causes transmission of the carrier wave and enables modulation of the carrier wave with the first electrical signals and the subsequent placement of said first switching means in said second condition automatically continues transmission of the carrier wave and modulates it with the second electrical signals, motor-operated cam means mechanically coupled to said second switching means, said second pair of contacts coupling a source of power to the motor of said motor-operated cam means, closure of said second pair of contacts causing power to be supplied to said motor to cause said cam means to rotate and open said second switching means for a predetermined time, whereby during the predeterined period of time said reproducing means will not convert the prerecorded message into second electrical signals irrespective of the condition of said first switching means.

26. In the transmitter of claim 25, wherein said first relay further includes a set of first and second and third contacts, said first contact being coupled to a voltage and said second contact being coupled to said first switching means and said third contact being coupled to the power supply, said first and second contacts being engaged when said first relay is energized and said first and third contacts being engaged when said first relay is de-energized.

27. In a transmitter having a carrier wave generating circuit and a power suply therefor and a modulator, an automatic identification system comprising input means for converting a message into first electrical signals, signal generating means for generating a predetermined message thereon and converting the message into second electrical signals, the modulator being coupled to said input means and to said signal generating means for modulating the carrier wave in accordance with the first or second electrical signals, switching means coupled to the power supply and having a first condition for energization thereof and having a second condition to de-energize the power supply, said switching means being operated into the first condition thereof when it is desired to operate said input means to provide said first electrical signals, control circuit means operatively coupled to said switching means and responsive to the placement thereof in said first condition and thereafter in said second condition to provide energizing signals, said signal generating means being coupled to said control circuit means and responsive to the energizing signals to convert the predeterined message into second electrical signals for application to the modulator, whereby placement of said switching means in its first condition causes modulation of the carrier wave with the first electrical signals and the subsequent placement of said switching means in said second condition automatically modulates the carrier wave with the second electrical signals, disabling means having a disabling condition for permanently decoupling from said control circuit means all actuations of said switching means occurring while said disabling means is in such disabling condition so as to insure that the second electrical signals will be furnished to the modulator only substantially immediately following furnishing of the first electrical signals thereto, and timing means coupled to said disabling means for placing said disabling means in the disabling condition thereof for recurring predetermined periods of time.

* * * * *

UNITED STATES PATENT OFFICE
CERTIFICATE OF CORRECTION

Patent No. 3,798,546 Dated March 19, 1974

Inventor(s) KEITH H. WYCOFF

It is certified that error appears in the above-identified patent and that said Letters Patent are hereby corrected as shown below:

Col. 3, line 35, "contact" should be -- contacts --.
Col. 4, line 27, "50" should be -- 51 --.
Col. 5, line 61, "42" should be -- 43 --.
Col. 6, line 11, "75" should be -- 74 --; line 43, "curciut" should be -- circuit.
Col. 7, line 27, "ground" should be -- grounds --.
Col. 8, line 42, "a" should be -- the --; same line, -- during -- should be inserted after "time"; line 62, a comma should be inserted after "means".
Col. 9, line 22, "25" should be -- 250 --; line 37, -- has -- should be inserted after "and".
Col. 10, line 4, "260" should be -- 250 --; line 54, "40" should be -- 240 --.
Col. 11, line 2, "242" should be -- 243 --; line 20, "275" should be -- 274 --; line 44, "40" should be -- 240 --; line 49, "ground" should be -- grounds --; line 58, "beings" should be -- begins --.
Col. 12, line 52, the second occurrence of "and" should be deleted.
Col. 13, line 52, "and", second occurrence, should be deleted.
Col. 15, line 22, "switching first" should be -- first switching --.
Col. 18, line 10, "switching first" should be -- first switching --; line 48, "suply" should be -- supply --

Signed and sealed this 16th day of July 1974.

(SEAL)
Attest:

McCOY M. GIBSON, JR.
Attesting Officer

C. MARSHALL DANN
Commissioner of Patent